(12) United States Patent
Castillo et al.

(10) Patent No.: US 9,944,051 B2
(45) Date of Patent: Apr. 17, 2018

(54) LAMINATE

(75) Inventors: Wilfred L. Castillo, Metro Manila (PH); Grace N. Mercado, Laguna (PH); Johnny D. Lee, Jr., Valenzuela (PH); Miling C. Fong, Valenzuela (PH); Calixto Y. Laureano, Metro Manila (PH)

(73) Assignee: Mead Johnson Nutrition Co., Chicago, IL (US)

( * ) Notice: Subject to any disclaimer, the term of this patent is extended or adjusted under 35 U.S.C. 154(b) by 2780 days.

(21) Appl. No.: 11/541,762

(22) Filed: Oct. 2, 2006

(65) Prior Publication Data

US 2008/0078502 A1   Apr. 3, 2008

(51) Int. Cl.
*B32B 15/12*   (2006.01)

(52) U.S. Cl.
CPC ....... *B32B 15/12* (2013.01); *Y10T 428/31605* (2015.04); *Y10T 428/31678* (2015.04); *Y10T 428/31692* (2015.04); *Y10T 428/31699* (2015.04); *Y10T 428/31993* (2015.04)

(58) Field of Classification Search
CPC ............ B32B 15/12; Y10T 428/31678; Y10T 428/31692; Y10T 428/31699; Y10T 428/31993; Y10T 428/31605
See application file for complete search history.

(56) References Cited

U.S. PATENT DOCUMENTS

| | | | |
|---|---|---|---|
| 2,073,780 A | * | 3/1937 | Brooks ................... 156/549 |
| 2,529,884 A | * | 11/1950 | Reynolds ................ 156/281 |
| 3,948,713 A | * | 4/1976 | Cannady, Jr. .......... 156/220 |
| 4,056,221 A | | 11/1977 | Piltz et al. |
| 4,087,300 A | * | 5/1978 | Adler .................... 156/184 |

(Continued)

FOREIGN PATENT DOCUMENTS

| | | |
|---|---|---|
| CA | 2473117 | 7/2006 |
| EP | 0101250 A | 2/1984 |

(Continued)

OTHER PUBLICATIONS

Waac Newsletter, May 1992, vol. 14, No. 2, pp. 13-17 by John Burke entitled Vapor Barrier Films. Online at http://palimpsest.stanford.edu/waac/wn/wn14/wn14-2/wn14-204.html.

(Continued)

*Primary Examiner* — Kevin R Kruer
(74) *Attorney, Agent, or Firm* — OspreyIP, pllc; James R. Cartiglia

(57) ABSTRACT

The invention relates to a method for preparing a laminate comprising providing an aluminum foil inner layer, a paper middle layer, and an aluminum foil outer layer; laminating the inner aluminum foil layer to the middle layer by a process selected from the group consisting of adhesive lamination with polyurethane, polyvinyl acetate, and an acrylic-type adhesive, and extrusion lamination with polyethylene; curing the inner aluminum foil layer and middle paper layer; laminating the middle paper layer and the outer aluminum foil layer by a process selected from the group consisting of adhesive lamination with polyurethane, polyvinyl acetate, and an acrylic-type adhesive, and extrusion lamination with polyethylene; and curing the inner aluminum foil layer, the middle paper layer and the outer aluminum foil layer.

14 Claims, 2 Drawing Sheets

(56) References Cited

U.S. PATENT DOCUMENTS

| | | | |
|---|---|---|---|
| 4,090,004 A | 5/1978 | Tebbutt et al. | 428/64 |
| 4,091,138 A * | 5/1978 | Takagi et al. | 428/209 |
| 4,220,254 A | 9/1980 | Morton | 220/354 |
| 4,242,165 A * | 12/1980 | Shaw | 156/313 |
| 4,347,943 A | 9/1982 | Hackwell et al. | 220/306 |
| 4,382,831 A * | 5/1983 | Clough et al. | 156/94 |
| 4,386,715 A | 6/1983 | Morton | 220/354 |
| 4,577,776 A | 3/1986 | Rayner et al. | 220/307 |
| 4,799,602 A | 1/1989 | Collins et al. | 220/307 |
| 5,077,084 A * | 12/1991 | Konotsune et al. | 427/99.4 |
| 6,129,800 A * | 10/2000 | Brinley | 156/209 |
| 6,193,544 B1 * | 2/2001 | McGinnis | 439/492 |
| 7,459,047 B2 * | 12/2008 | Usuki et al. | 156/87 |
| 7,582,976 B2 * | 9/2009 | Seko et al. | 257/786 |
| 2003/0094697 A1 * | 5/2003 | Higashida et al. | 257/758 |
| 2004/0076832 A1 * | 4/2004 | Nagai et al. | 428/413 |
| 2006/0202349 A1 * | 9/2006 | Higashida et al. | 257/777 |
| 2007/0090086 A1 * | 4/2007 | Yamagata et al. | 216/13 |
| 2009/0142607 A1 * | 6/2009 | Narui et al. | 428/458 |

FOREIGN PATENT DOCUMENTS

| | | | |
|---|---|---|---|
| EP | 0763472 A | | 3/1997 |
| EP | 1327516 A | | 7/2003 |
| JP | 57-165472 | * | 10/1982 |
| JP | 63-116834 | * | 5/1988 |
| JP | 2001-179886 | * | 7/2001 |
| WO | WO03/059622 A | | 7/2003 |

OTHER PUBLICATIONS

Document by Porextherm Därnmstoffe GmbH: Vacupor Barrier Material Selection entitled Barrier Material Selection, pp. 1-5 dated Aug. 16, 2005. Online at http://www.porextherm.com/en/inh_vacupor_barrier.htm.

Document by CorrPakBPS entitled Aluminum Barrier Foil Container, pp. 1-2 dated Aug. 16, 2005. Online at http://www.corrpakbps.com/aluminum_barrier_foil.html.

Document by Sorbentsystems.com entitled Glossary of Flexible Packaging Terms (Quicklist) pp. 1-2 dated Aug. 16, 2005. Online at http://www.sorbentsystems.com/printed_packaging/glossary_common.html.

PDF Document by Kpr Adcor Inc. entitled Vapor Barrier Foil 12990—Triple Laminated Barrier Foil Custom Made Films and Bags. Online at www.corrosion.com/pdf/foil-packaging.pdf.

International Search Report (Form PCT/ISA/210).

* cited by examiner

LAMINATE

BACKGROUND OF THE INVENTION (1) Field of the Invention

The present invention relates to a novel laminate.

(2) Description of the Related Art

In the packaging of certain products, such as food products in particular, it is highly desirable to impede or prevent the transmission of oxygen and/or water vapor through the packaging. While the permeation of oxygen or water vapor itself is not necessarily harmful to the product, the quality and shelf-life of the product may deteriorate when exposed to these elements.

In packaging containers of varying shapes and constructions, 100% aluminum seals are often used to protect the products inside the container from oxygen or water vapor. These seals are often bonded between the container itself and some type of lid. In other configurations, the aluminum seal may be the only lid that the container has.

Seals made from aluminum are often selected based on the superior barrier properties of aluminum. The effectiveness of such barriers depends on both the type of material employed and the barrier's thickness. For example, a 0.001 inch layer of 100% aluminum foil is impermeable to moisture and oxygen and a 0.00035 inch layer of 100% aluminum foil has a water vapor transmission rate of 0.02 grams or less per 100 square inches.

Due to the ever-increasing cost of aluminum, however, it has become necessary to find alternative membranes which are less expensive than aluminum yet still deliver the necessary barrier properties. In addition, high gauges of aluminum used in known membranes also pose some risk to consumers if the consumer punctures the seal by hand. Specifically, the sharp aluminum edges surrounding the puncture location can cause minor scratches or cuts to the hand. Attempts to substitute more cost effective substitutes for the 100% aluminum seals have been met with limited success. One reason is because in addition to the necessary barrier properties, the replacement material must also be able to withstand various manufacturing and processing conditions to which the packaging containers are subjected.

SUMMARY OF THE INVENTION

Briefly, therefore, the present invention is directed to a novel method for preparing a laminate. The method comprises (1) providing an aluminum foil inner layer, a paper middle layer, and an aluminum foil outer layer; (2) laminating the inner layer to the middle layer by either adhesive lamination with polyurethane, polyvinyl acetate, or an acrylic-type adhesive, or by extrusion lamination with polyethylene; (3) curing the inner and middle layers; (4) laminating the middle layer and the outer layer by adhesive lamination with polyurethane, polyvinyl acetate, or an acrylic-type adhesive, or by extrusion lamination with polyethylene; and (5) curing the inner, middle and outer layers.

In an embodiment, the method comprises (1) providing an aluminum foil inner layer, a paper middle layer, and an aluminum foil outer layer; (2) laminating the inner layer to the middle layer by adhesive lamination with polyvinyl acetate; (3) curing the inner and middle layers; (4) laminating the middle layer and the outer layer by extrusion lamination with polyethylene; and (5) curing the inner, middle and outer layers.

In other embodiment, the invention is directed to a novel laminate. The laminate comprises an inner layer of aluminum foil, wherein the inner is layer bonded to a first side of a middle layer of paper. The middle layer is bonded on a second side to an outer layer of aluminum foil. The inner and outer layers are bonded to the first and second sides of the middle layer by adhesive lamination with polyurethane, polyvinyl acetate, or an acrylic-type adhesive, or by extrusion lamination with polyethylene.

In another embodiment, the laminate comprises an inner layer of aluminum foil, wherein the inner layer is bonded to a first side of a middle layer of paper. The middle layer is bonded on a second side to an outer layer of aluminum foil. The inner layer is bonded to the middle layer by adhesive lamination with polyvinyl acetate and the middle layer is bonded to the outer layer by extrusion lamination with polyethylene.

Additionally, a laminate comprising an inner layer of aluminum foil bonded to a first side of a middle layer of plastic film is provided in an embodiment. The middle layer is bonded on a second side to an outer layer of aluminum foil. The inner and outer layers are bonded to the first and second sides of the middle layer by either adhesive lamination with polyurethane, polyvinyl acetate, or an acrylic-type adhesive, or by extrusion lamination with polyethylene.

DETAILED DESCRIPTION OF THE PREFERRED EMBODIMENTS

Figure 1:
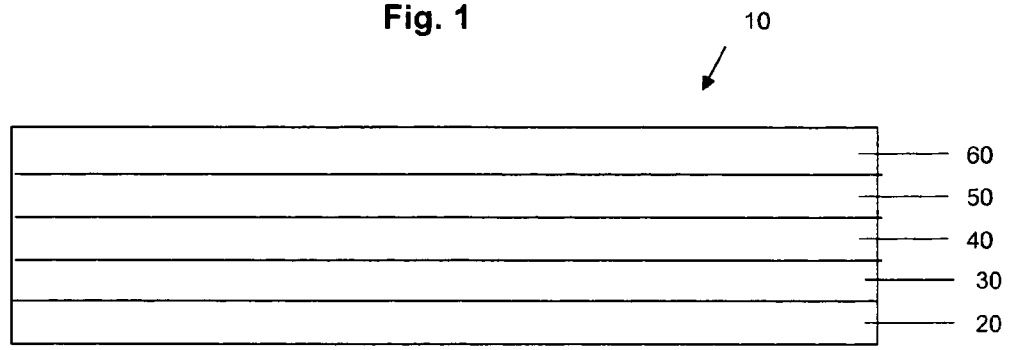
FIG. 1 is an exaggerated cross-section of an embodiment of the laminate of the present invention.

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment.

Thus, it is intended that the present invention covers such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In an embodiment, the laminate comprises an inner layer of aluminum foil, wherein the inner layer is bonded to a first side of a middle layer of paper. As used herein, the terms "inner layer" or "inner aluminum foil layer" are defined as the layer located nearest to a product. Thus, if the laminate is formed into a container or bag, or is sealed onto a container, the "inner layer" of aluminum foil is the layer located nearest to the inside of the container or bag, or the layer located nearest to the product.

The middle layer is bonded on a second side to an outer layer of aluminum foil. As used herein, the terms "outer layer" or "outer aluminum foil layer" are defined as the layer located furthest from a product. Thus, if the laminate is formed into a container or bag, or is sealed onto a container, the "outer layer" of aluminum foil is the layer located on the outside of the container or bag, or the layer located furthest from the product.

In an embodiment, the inner and outer layers are bonded to the first and second sides of the middle layer by adhesive lamination with polyurethane, polyvinyl acetate, or an acrylic-type adhesive or by extrusion lamination with polyethylene.

In another embodiment of the invention, the inner layer is bonded to the middle layer by adhesive lamination with polyvinyl acetate. In yet another embodiment, the middle layer is bonded to the outer layer by extrusion lamination with polyethylene. In a particular embodiment, the inner layer is bonded to the middle layer by adhesive lamination with polyvinyl acetate and the middle layer is bonded to the outer layer by extrusion lamination with polyethylene.

In some embodiments, the inner layer of aluminum foil can be in the range of about 12 and 45 microns in thickness. In other embodiments, the inner layer of aluminum foil can be in the range of about 15 and 30 microns in thickness. In a particular embodiment, the inner layer of aluminum foil can be about 20 microns in thickness.

In some embodiments, the middle layer of paper can be in the range of about 10 and 70 grams per square meter (gsm) in basis weight. In certain other embodiments, the middle layer of paper can be in the range of about 20 and 60 gsm in basis weight. In yet another embodiment, the middle layer of paper can be in the range of about 30 and 50 gsm in basis weight. In a particular embodiment, the middle layer of paper can be about 40 gsm basis weight. The thickness of the middle paper layer should be sufficient to allow the laminate to be processed without cracking or crumpling the layers. The paper can be any type of paper known in the art. In a particular embodiment, the paper comprises a machine glazed or finished paper.

In one embodiment of the invention, the middle layer can comprise plastic film rather than paper. The thickness of the plastic film should be sufficient to allow the laminate to be processed without cracking or crumpling the layers. The plastic film can be any type of plastic film known in the art. In a particular embodiment, the plastic film can comprise serrated polyester.

In some embodiments, the outer layer of aluminum foil can be in the range of about 12 and 45 microns in thickness. In other embodiments, the outer layer of aluminum foil can be in the range of about 15 and 30 microns in thickness. In a particular embodiment, the outer layer of aluminum foil can be about 20 microns in thickness.

It is not necessary that the inner and outer aluminum layers have equal thicknesses. The inner and outer aluminum layers should, however, be thick enough to avoid the creation of pin holes in the barrier layers of the laminate. The aluminum foil used in the present invention can be any type of aluminum foil known in the art. In certain embodiments, the aluminum foil can be soft, tempered, or annealed. In particular embodiments, the inner and/or outer layers of aluminum foil have one bright side and one matte-finished, dull side. The foils of the inner and outer layers are not required to be identical.

In some embodiments, the middle layer is bonded to the inner layer on its bright side. In other embodiments, the middle layer is bonded to the inner layer on its dull side. Similarly, in some embodiments, the middle layer is bonded to the outer layer on its bright side. In other embodiments, the middle layer is bonded to the outer layer on its dull side.

According to an embodiment of the present invention, the inner and middle layers can be bonded together using adhesive lamination with polyurethane, polyvinyl acetate, or an acrylic-type adhesive or by using extrusion lamination with polyethylene.

In one embodiment of present invention, polyvinyl acetate can be used to laminate the inner and middle layers. In certain embodiments, the polyvinyl acetate can be water-based. In a particular embodiment, the polyvinyl acetate can be applied directly to the dull side of the inner layer of aluminum foil, which is then contacted with the paper middle layer.

In another embodiment of present invention, polyurethane can be used to laminate the inner and middle layers. In certain embodiments, the polyurethane can be water-based, medium-performance Polyurethane base Soventbase Adhesive or Hot System Solvent-free Adhesive. In a particular embodiment, the polyurethane can be applied directly to the dull side of the inner layer of aluminum foil, which is then contacted with the paper middle layer. In this embodiment, the polyurethane may be applied while it is still wet. Because the middle paper layer is porous and permeable, the water content in the adhesive can escape through the paper layer.

In an embodiment, the bonded inner and middle layers are then cured. As used herein, the terms "cure", "cured", or "curing" can refer to any process that hardens a polymer material through the cross-linking of polymer chains, including, but not limited to the use of chemical additives, thermal radiation, ultraviolet radiation, or heat. In a particular embodiment, ovens may be employed to cure the layers. Curing may likewise be achieved in an embodiment by storing the bonded layers under preset temperature and humidity conditions.

In some embodiments, after the laminate has cured, it can be kept at ambient temperature for at least 48 hours before the middle layer is laminated to the outer layer.

In an embodiment, the middle layer can be laminated to the outer aluminum layer using adhesive lamination with polyurethane, polyvinyl acetate, or by an acrylic-type adhesive or extrusion lamination with polyethylene. In a particular embodiment, the lamination of the middle layer to the outer layer is effected via extrusion lamination with polyethylene. In some embodiments, the polyethylene is a molten resin. In certain embodiments, extrusion lamination can also accomplished using low density polyethylene (LDPE), linear low density polyethylene (LLDPE), medium density polyethylene (MDPE), copolymer polyethylene, ethylene-acrylic acid (EM), or ethylene methacrylic acid (EMM), or terpolymer polyethylene, EM, or EMM, any of which can be in molten resin form.

In particular embodiments, the molten resin is applied directly between the middle paper layer and the bright side of the outer aluminum layer. The molten resin layer can, for example, be between about 10 and 20 microns in thickness. In a particular embodiment, the molten resin layer is about 15 microns in thickness.

In certain embodiments, after the middle layer and outer layer are bonded, the entire laminate is cured. The curing after the final lamination step can be achieved by any process known in the art. In a particular embodiment, however, the curing is achieved via thermal radiation, by use of an oven, or through storage under preset temperature and humidity conditions. In an embodiment, after the laminate has cured, it remains at ambient temperature for at least 48 hours before being further processed.

In some embodiments of the invention, the exposed surfaces of the laminated aluminum layers can be coated with a slip coating. The slip coating, in certain embodiments, can be any slip coating known in the art. In a particular embodiment, the slip coating can be nitrocellulose-based or vinyl copolymer-based slip coating. The slip coating serves as a type of varnish, protecting the surfaces of the aluminum from scratching. If desired, the slip coating can be applied to the exposed surfaces of both the laminated inner and outer aluminum foil layers using techniques known in the art.

The laminate of the present invention can be used to package or seal a package containing any product known in the art to require a high moisture and/or oxygen barrier. For example, the laminate may seal the mouth of a container, can, or jar. In an embodiment, the laminate is used to package a foodstuff, pharmaceutical product, industrial product or agricultural product. Solid, powdered or liquid products can be packaged by the present invention.

In certain embodiments, the laminate of the present invention is used to seal a container which contains food products. In a particular embodiment, the laminate can be used to seal a container which contains an infant formula, nutritional supplement, human milk fortifier, or children's enteral product. The laminate can be bonded to a container, if necessary. For example, the laminate can be a peelable-type seal on a container, such as an easy-open seal or an easy-peel seal.

In a particular embodiment, the laminate of the present invention is used to manufacture a membrane to be positioned between the friction ring and the container of a lever lid assembly. Containers having lever lids, also known as penny lever lids, plug lids, or friction-fit lids, typically have a body member which is closed at the bottom and has an opening at the top. The laminate of the present invention can be sealed to the container top and then an internally extending peripheral ring, also known as a friction ring, can be positioned and sealed to the top of the container. The peripheral ring is adapted to receive a plug cover. The present laminate is able to withstand various processing conditions used to manufacture a lever lid assembly, such as stamping and curling.

When used in combination with a lever lid assembly, the laminate of the present invention is often removed by the consumer by puncturing or cutting it and removing it from the container by hand. The use of 100% aluminum foil in this application often causes chipping of the aluminum into the product. Additionally, the edges of 100% aluminum foil can become sharp after the aluminum has been punctured or cut. These sharp edges can cause minor scratches and injuries. The laminate of the present invention is less likely to flake or chip into the product and the edges of the punctured laminate are less likely to scratch or injure the consumer upon puncture of the seal.

The present invention may provide a laminate having barrier properties exhibited by a 100 micron aluminum foil and the mechanical handling characteristics inherent to 100% aluminum. The aluminum layers provide the necessary barrier properties while the middle paper or plastic film layer delivers the necessary thickness and mechanical handling stability. In addition, due to the small amount of aluminum foil used in the present invention, the cost of the material is substantially reduced over that of 100% aluminum foil.

Referring now to the drawings, FIG. 1 illustrates an exaggerated cross-sectional view of an embodiment of the laminate 10 of the present invention. In this embodiment, the inner aluminum foil layer 20 is bonded, using a polyurethane layer 30, to a first side of the middle paper layer 40. The middle paper layer 40 is bonded on a second side to an outer aluminum foil layer 60 using a low density polyethylene layer 50.

Figure 2:
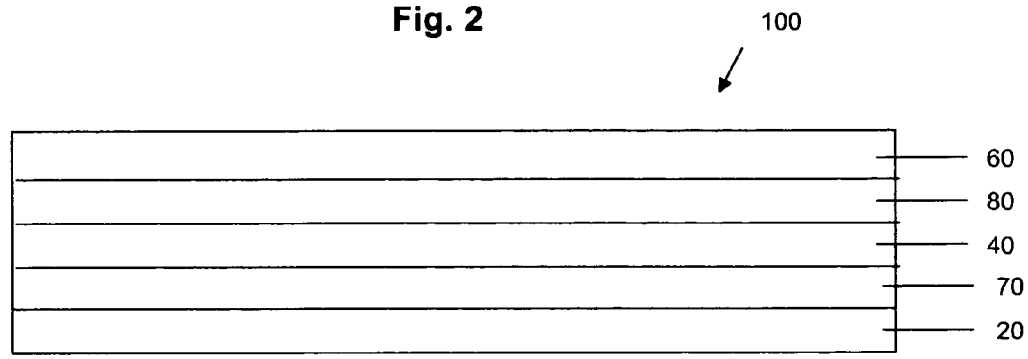
FIG. 2 is an exaggerated cross-section of an alternate embodiment of the laminate of the present invention.

In another embodiment of a laminate 100 of the present invention, shown in FIG. 2, the inner aluminum foil layer 20 is bonded using a polyvinyl acetate layer 70 to a first side of the middle paper layer 40. The middle paper layer 40 is bonded on a second side to an outer aluminum foil layer 60 using a polyethylene layer 80.

In certain embodiments of the invention, multiple inner and/or outer plies of aluminum foil can be used. In other embodiments, multiple plies of the middle paper or plastic film layer can be used. In further embodiments, the various layers can be bonded using any lamination process or combination or lamination processes known. For example, a combination of wet adhesive lamination and dry adhesive lamination can be used to bond the various layers.

In some embodiments of the invention, the total weight of the laminate can be between about 150 gsm and 190 gsm. In a particular embodiment, the total weight of the laminate can be about 170 gsm. In some embodiments of the invention, the total thickness of the laminate can be between about 110 microns and 140 microns. In a particular embodiment, the total thickness of the laminate can be about 122 microns.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight basis unless otherwise indicated.

Example 1

This example illustrates the preparation of an embodiment of an alternate membrane laminate of the present invention as well as its properties under testing.

In this example, a layer of aluminum foil (20 microns in thickness) was bonded to a 40 gsm paper layer using an adhesive lamination process with polyurethane. The laminate was then cured by processing it at about 90 to about 96° C. oven temperature at a speed of about 100 meters/minute. The laminate was then stored at ambient temperature for 48 hours. Afterward, the middle paper layer was bonded to an outer aluminum foil layer (20 microns in thickness) using an extrusion lamination process with polyethylene. The laminate was again cured by processing it at about 320° C. extrusion temperature at a speed of about 80 meters/minute. The laminate was stored at ambient temperature for 48 hours. The laminate was then coated on both exposed aluminum surfaces with a nitrocellulose-based slip coating. The laminate was then cut to the appropriate size and was sealed onto a container. Tests of water vapor and oxygen transmission rates of the laminate gave results of 0.1 to 0.0 gsm/day and 0.1 to 0.0 cc/sqm/day respectively. Test conditions were set at 38° C., 90% relative humidity for water vapor and 23° C. and 0% relative humidity for oxygen transmission rates.

The laminate seal was tested by simulating a consumer's opening of the seal using a spoon and serrated knife. If any aluminum remains or chips had fallen into the product, the laminate seal would not have performed in an acceptable manner. The results of this test showed no traces of aluminum in the product. Thus, the laminate seal performed acceptably.

The laminate was tested for material integrity by passing a light through the laminate to detect the presence of foil cracking at the middle of the laminate. The results of this test showed no cracking in the laminate.

Testing was also conducted to determine the shelf-life of a product stored within a container sealed using the laminate of the present invention. Containers filled with milk powder were sealed with the laminate of Example 1. The containers were stored for 18 months under accelerated storage conditions (30° C.). The viability of the product was monitored on a regular basis during the stability study. The results of the study showed that the viability of the product was assured for 18 months under accelerated conditions and for 36 months at normal conditions. All vitamin levels and sensory characteristics were within acceptable limits.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties to the extent that they do not conflict with anything stated herein. The discussion of the references herein is intended merely to summarize the assertions made by their authors and no admission is made that any reference constitutes prior art. Applicants reserve the right to challenge the accuracy and pertinence of the cited references.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. For example, while methods for the production of a commercially sterile liquid nutritional supplement made according to those methods have been exemplified, other uses are contemplated. Therefore, the spirit and scope of the appended claims should not be limited to the description of the preferred versions contained therein.

What is claimed is:

1. A method for preparing a laminate comprising:
    a) providing an inner aluminum foil layer, a paper layer, and an outer aluminum foil layer;
    b) providing an inner adhesive layer between the inner aluminum foil layer and the paper layer, wherein the inner adhesive layer comprises an adhesive selected from the group consisting of polyurethane, polyvinyl acetate, and an acrylic-type adhesive;
    c) laminating the inner foil layer, the inner adhesive layer, and the paper layer;
    d) curing the inner adhesive layer by heating the inner foil layer, the inner adhesive layer and the paper layer by use of an oven;
    e) providing an outer adhesive layer between the paper layer and the outer aluminum foil layer, wherein the outer adhesive layer comprises an adhesive selected from the group consisting of polyurethane, polyvinyl acetate, and an acrylic-type adhesive;
    f) laminating the inner aluminum foil layer, the inner adhesive layer, the paper layer, the outer adhesive layer and the outer aluminum foil layer; and
    g) curing the outer adhesive layer by use of an oven.

2. The method according to claim 1, wherein the inner aluminum foil layer comprises a dull side and a bright side and further wherein the dull side of the inner aluminum foil layer is bonded to the paper layer by the inner adhesive layer.

3. The method according to claim 1, wherein the outer aluminum foil layer comprises a dull side and a bright side and further wherein the dull side of the outer aluminum foil layer is bonded to the middle paper layer by the outer adhesive layer.

4. The method according to claim 1, wherein the thickness of the inner aluminum foil layer is in the range of about 12 and 45 microns.

5. The method according to claim 1, wherein the thickness of the inner aluminum foil layer is about 20 microns.

6. The method according to claim 1, wherein the basis weight of the paper layer is in the range of about 10 and 70 grams per square meter.

7. The method according to claim 1, wherein the basis weight of the paper layer is about 40 grams per square meter.

8. The method according to claim 1, wherein the paper layer is a machine glazed paper.

9. The method according to claim 1, wherein the thickness of the outer aluminum foil layer is in the range of about 12 and 45 microns.

10. The method according to claim 1, wherein the thickness of the outer aluminum foil layer is about 20 microns.

11. A method for preparing a laminate comprising:
    a) providing an inner aluminum foil layer, a paper layer, and an inner adhesive layer comprising polyvinyl acetate between the inner aluminum foil layer and the paper layer;
    b) laminating the inner aluminum foil layer, the inner adhesive layer, and the paper layer by adhesive lamination;
    c) curing the inner adhesive layer by heating the inner foil layer, the inner adhesive layer and the paper layer by use of an oven;
    d) providing an outer adhesive layer comprising polyethylene between the paper layer and an outer aluminum foil layer;
    e) laminating the inner aluminum foil layer, the inner adhesive layer, the paper layer, the outer adhesive layer, and the outer aluminum foil layer by extrusion lamination.

12. The method according to claim 11, wherein the outer adhesive layer comprises low density polyethylene.

13. The method according to claim 11, wherein the thickness of the outer adhesive layer is in the range of about 10 and 20 microns.

14. The method according to claim 11, wherein the thickness of the outer adhesive layer is about 15 microns.

* * * * *